United States Patent Office 3,306,560
Patented Feb. 28, 1967

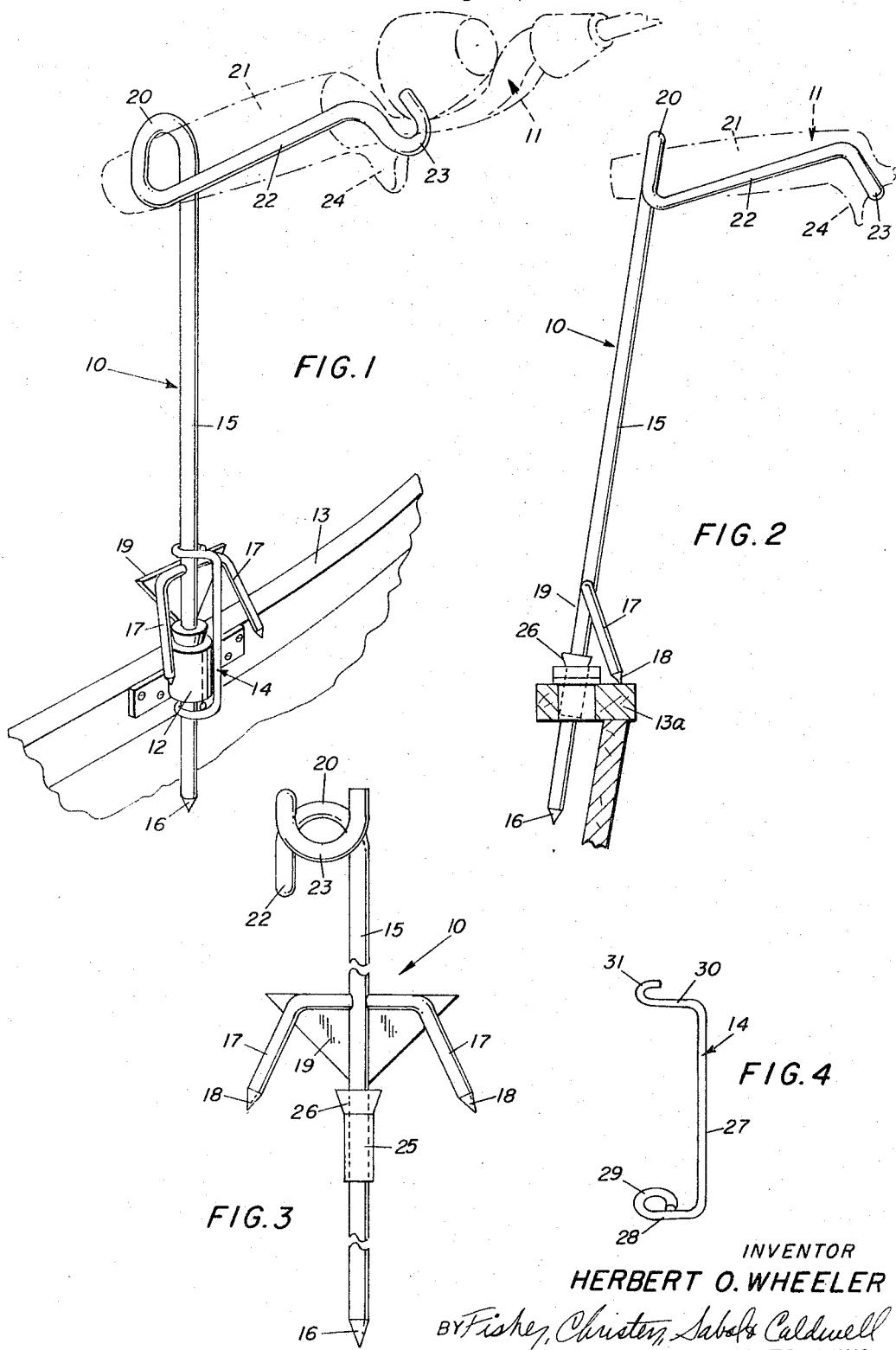

3,306,560
FISHING ROD HOLDER
Herbert O. Wheeler, 633 Forsythe Ave.,
Calumet City, Ill. 60409
Filed Aug. 29, 1966, Ser. No. 575,612
6 Claims. (Cl. 248—42)

This invention relates to sporting equipment, and more particularly to a holder for a fishing rod which may be inserted in the ground when fishing from the shore line or can be attached to the side of a small boat, the holder having means to prevent accidental loss of the holder when used in a boat.

One object of the invention is to provide an inexpensive fishing rod holder which may be fabricated from metal rod.

Another object of the invention is to provide a fishing rod holder having a supporting end portion which can be pushed into the ground or may be inserted into an oarlock in a boat and which, when used in the latter condition, is provided with a positive locking means to prevent accidental removal of the holder and its loss overboard.

Other objects and advantages will be apparent to those skilled in the art after reading the following specification in connection with the attached drawings, in which:

FIGURE 1 is an isometric view of a preferred form of fishing rod holder made in accordance with the present invention showing its use when attached to an oarlock of a boat where the oarlock is installed outboard;

FIGURE 2 is a side elevation of the device shown in FIGURE 1 with the locking mechanism removed and with the oarlock installed inboard;

FIGURE 3 is a front elevation of the holder, and;

FIGURE 4 is an isometric view of the locking means shown in FIGURE 1.

FIGURE 1 shows a preferred form of fishing rod holder made in accordance with this invention and indicated generally by numeral 10, having a cradle at its upper end to support the handle portion of a fishing rod, indicated generally by numeral 11, with the supporting end of the holder mounted in an oarlock 12 positioned outboard of the coaming 13 of a row boat, only a fragmentary portion of which is shown, the locking means for the holder being indicated generally by numeral 14.

As will be observed in the drawings, the holder 10 may be formed by appropriately bending a length of metal bar stock so as to provide a straight main body, or staff portion 15, terminating at its lower end in a point 16 to facilitate the insertion of the staff into the ground or any other appropriate receptacle, such as an oarlock. Spaced upwardly from the lower end are a pair of outwardly and downwardly projecting supporting arms 17, the ends of which are also pointed, as at 18. These arms may also be formed from rod stock welded to the staff portion and they may also be reinforced by the provision of a triangular plate member 19 which may be welded to the staff and arms or attached in any other appropriate manner.

The upper end of the staff portion terminates in a re-entrantly curved portion 20 extending over approximately 180 degrees of an arc to form one portion of a cradle and into which the rear end of the handle 21 of a fishing rod may be inserted. In order to properly position the fishing rod, the plane of this re-entrantly curved portion should lie generally parallel with the plane of the upper portions of the arms 18.

After the curve 21 has been formed the bar stock is then bent in a direction lying in a plane generally normal to the plane previously mentioned and at an angle slightly upwardly with respect to the staff portion to form a straight connecting portion 22 for a second re-entrantly curved and downwardly extending cradle portion 23 which is intended to hold the forward portion of a fishing rod, preferably just forward of the usual finger grip 24.

The device as just described is suitable for use on shore as it is only necessary to insert the pointed end 16 of the shaft into the ground a sufficient distance so that the two arms 17 will come in contact and become partially embedded in the soil to serve as stabilizing elements. However, for use in a boat, and in order to eliminate any noise which might frighten away the fish, it may be desirable to provide the lower end of the staff with a resilient collar or grommet 25 of rubber, neoprene or any other suitable material, the upper portion of this collar having an outwardly enlarged annular rim 26 of a sufficiently large diameter to limit the downward movement of the staff when inserted in an oarlock as shown in FIGURES 1 and 2. It will be noted that in FIGURE 1 where the oarlock is placed on the outside of the coaming, the arms 17 are unsupported, whereas in FIGURE 2 where the oarlock is installed inboard, these arms may rest upon the upper surface of the coaming 13a.

The locking means, which also may be formed from a length of metal bar stock, is shown in FIGURE 4 and comprises a straight middle section 27, one end of which has a straight elbow portion 28 turned at right angles to middle portion and terminating in a curved portion 29 which forms a complete circle having an inner diameter to be easily slipped over the lower end of the staff portion of the holder itself. The other end of the middle section 27 also has a straight elbow portion 30 extending at right angles and in the same plane as the first-mentioned elbow 28. However, while the elbow 30 terminates in a curved portion 31, it does not extend over a full circle but only an arc of approximately 180 degrees, for a purpose which will be evident later.

When the holder is to be inserted in an oarlock, the staff portion provided with the collar 25 is placed in the oarlock after which the circular end of the lower elbow portion 28 of the locking means is slipped over the end of the staff which projects downwardly below the oarlock and the whole locking means is raised upwardly until the semi-circular end of the upper elbow portion 30 can be positioned to partially encircle the staff portion of the holder at a point above the location where the arms 17 join the staff as shown in FIGURE 1. In this position it will be apparent that the locking means 14 will be retained in place and, that until it is removed it is impossible for the fishing rod holder 10 to be accidentally removed from the oarlock and lost overboard.

It will also be evident that the locking means can be used in the reverse position if the elbow portion 28 is threaded onto the upper portion of the staff by manipulation through the cradles 23 and 20 before the fishing rod is placed in position. In this fashion the locking means will dangle loosely from the staff with the elbow 28 resting on the upper surfaces of the arms 17 when the staff is inserted into an oarlock and, after insertion, the elbow 30 can be connected around the staff below the oarlock to accomplish the same purpose as when manipulated in the previously described procedure.

Having disclosed a preferred form in which the invention may be made, it will be apparent to those skilled in the art that various modifications and improvements may be made which would come within the scope of the annexed claims.

I claim:

1. In a holder means for fishing rods, the combination including an elongated staff portion including cradle means for supporting the handle of a fishing rod in a generally horizontal position, the lower end of the staff portion being adapted for downward insertion into an open receptacle and to project below said receptacle, and locking means for the holder means, said locking means including an elongated element to be disposed outside the oarlock and generally parallel with the staff and having two spaced retaining means for at least partially encircling the staff portion at longitudinally spaced points, one above the oarlock and one below the oarlock.

2. The invention as defined in claim 1, wherein one of said retaining means completely encircles said staff and the second retaining means only partially encircles the staff to permit placement after the staff is inserted in an oarlock.

3. The invention as defined in claim 1, wherein said staff portion includes at least one auxiliary supporting arm.

4. The invention as defined in claim 1, wherein said holder portion includes resilient grommet means encircling a short length of the staff portion.

5. The invention as defined in claim 4, wherein said grommet means includes an enlarged annular portion to limit downward movement of the staff portion.

6. The invention as defined in claim 5, wherein said staff portion includes at least one auxiliary arm for stabilizing the holder.

References Cited by the Examiner
UNITED STATES PATENTS

| | | | |
|---|---|---|---|
| 2,139,826 | 12/1938 | Huntley | 248—44 |
| 2,430,112 | 11/1947 | Hamre | 248—42 |
| 2,517,937 | 8/1950 | Stanton | 248—42 |
| 2,593,783 | 4/1952 | Mitchell | 248—38 |
| 2,751,174 | 6/1956 | Parker | 248—42 |
| 2,981,509 | 4/1961 | Messenger et al. | 248—42 |
| 3,074,674 | 1/1963 | Hill | 248—45 |

CLAUDE A. LE ROY, *Primary Examiner.*